United States Patent
Schroeder et al.

(10) Patent No.: US 8,291,510 B2
(45) Date of Patent: Oct. 16, 2012

(54) TANDEM PIEZOELECTRIC ACTUATOR AND SINGLE DRIVE CIRCUIT FOR ATOMIC FORCE MICROSCOPY

(75) Inventors: Dale W. Schroeder, Santa Clara, CA (US); Richard P. Tella, Sunnyvale, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 51 days.

(21) Appl. No.: 12/890,894

(22) Filed: Sep. 27, 2010

(65) Prior Publication Data

US 2012/0079634 A1 Mar. 29, 2012

(51) Int. Cl.
*G01Q 60/24* (2010.01)

(52) U.S. Cl. ......... 850/4; 850/1; 850/8; 850/21; 850/33; 850/52; 250/306; 250/310

(58) Field of Classification Search ............. 250/306, 250/310; 850/1, 4, 8, 21, 33, 52
See application file for complete search history.

(56) References Cited

U.S. PATENT DOCUMENTS

| | | | |
|---|---|---|---|
| 5,986,381 A | 11/1999 | Hoen et al. | |
| 6,590,208 B2 * | 7/2003 | Massie | 850/52 |
| 7,391,235 B2 * | 6/2008 | Mouttet | 326/39 |
| 2002/0178802 A1 * | 12/2002 | Ookubo | 73/105 |
| 2006/0043286 A1 * | 3/2006 | Massie | 250/306 |

OTHER PUBLICATIONS

Fleming, et al. "Ultra-Fast Dual-Stage Vertical Positioning for High Performance SPMs", 2010 American Control Conference, Marriott Waterfront, Baltimore, MD, USA Jun. 30-Jul. 2, 2010, pp. 4975-4980.

* cited by examiner

*Primary Examiner* — Michael Logie (57) ABSTRACT

An apparatus for atomic force microscopy (AFM) comprises a first actuator configured to move a cantilever along an axis; a second actuator configured to move the cantilever along the axis; an amplifier; and a crossover network connected between the amplifier, and the first actuator and the second actuator. The crossover network is adapted to provide a first drive signal to the first actuator over a first frequency range and to provide a second drive signal to the second actuator over a second frequency range.

16 Claims, 8 Drawing Sheets

TANDEM PIEZOELECTRIC ACTUATOR AND SINGLE DRIVE CIRCUIT FOR ATOMIC FORCE MICROSCOPY

BACKGROUND

An atomic force microscope (AFM) is a comparatively high-resolution type of scanning probe microscope. With demonstrated resolution of fractions of a nanometer, AFMs promise resolution more than 1000 times greater than the optical diffraction limit.

Many known AFMs include a microscale cantilever with a sharp tip (probe) at its end that is used to scan the specimen surface. The cantilever is typically silicon or silicon nitride with a tip radius of curvature on the order of nanometers. When the tip is brought into contact with a sample surface, forces between the tip and the sample lead to a deflection of the cantilever. One or more of a variety of forces are measured via the deflection of the cantilevered probe tip. These include mechanical forces and electrostatic and magnetostatic forces, to name only a few.

Typically, the deflection of the cantilevered probe tip is measured using a laser spot reflected from the top of the cantilever into a position detector. Other methods that are used include optical interferometry and piezoresistive AFM cantilever sensing.

In many AFMs, a feedback mechanism is employed to maintain the angular deflection of the tip nearly constant. The required movement of the tip to maintain the constant angular deflection provides a map of the area s=f(x,y) representative of the topography of the sample.

One component of AFM instruments is the actuator that maintains the angular deflection of the tip that scans the surface of the sample. Most AFM instruments use three orthonormal axes to scan the sample. The first two axes (e.g., X and Y axes) are driven to raster scan the surface area of the sample with typical ranges of 100 µm in each direction. The third axis (e.g., Z axis) drives the tip orthogonally to X and Y for tracking the topography of the surface.

Generally, the actuator for Z axis motion of the tip to maintain a near-constant deflection requires a comparatively smaller range of motion (e.g., approximately 1 µm (or less) to approximately 10 µm). However, as the requirement of scan speeds of AFMs increases, the actuator for Z axis motion must respond comparatively quickly to variations in the surface topography. For example, to scan at comparatively high speed ($\geq 0.5$ frames/sec or approximately 250 Hz or greater) and maintain suitable image quality requires a Z-axis actuator system capable of closed-loop response typically 20 kHz or higher. Known actuators capable of such speeds or ranges of motion are generally limited to piezoelectric technology. Unfortunately, known piezoelectric actuator designs with a range of motion as great as approximately 10 µm have a comparatively high capacitance and are difficult to drive at high frequency without incurring resonance-related drawbacks that limit closed-loop response. For this reason known Z axis actuators are configured to operate at much slower scan rates (typically 0.5 min/frame to 3 min/frame) to achieve good image quality, or must sacrifice scan range (typically less than 1 µm).

There is a need, therefore, for a piezoelectric actuator for an AFM that overcomes at least the shortcomings of known actuators discussed above.

SUMMARY

In a representative embodiment, an apparatus for atomic force microscopy (AFM) comprises a first actuator configured to move a cantilever along an axis; a second actuator configured to move the cantilever along the axis; an amplifier; and a crossover network connected between the amplifier, and the first actuator and the second actuator. The crossover network is adapted to provide a first drive signal to the first actuator over a first frequency range and to provide a second drive signal to the second actuator over a second frequency range. The second actuator has an intrinsic capacitance and the crossover network forms a low pass frequency filter with the intrinsic capacitance In another representative embodiment, a drive circuit for driving a first actuator and a second actuator of an atomic force microscopy (AFM) apparatus comprises an amplifier; and a crossover network connected between the amplifier, and the first actuator and the second actuator. The crossover network is adapted to provide a first drive signal to the first actuator over a first frequency range and to provide a second drive signal to the second actuator over a second frequency range. The second actuator has an intrinsic capacitance and the crossover network forms a low pass frequency filter with the intrinsic capacitance

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DETAILED DESCRIPTION

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the example embodiments. Nonetheless, such devices, materials and methods that are within the purview of one of ordinary skill in the art may be used in accordance with the representative embodiments.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

The representative embodiments are described in connection with AFM applications. However, this is merely illustrative and other applications are contemplated. In particular, the present teachings may be applied in situations requiring accurate alignment of a component that is comparatively difficult to align in-situ.

Figure 1:
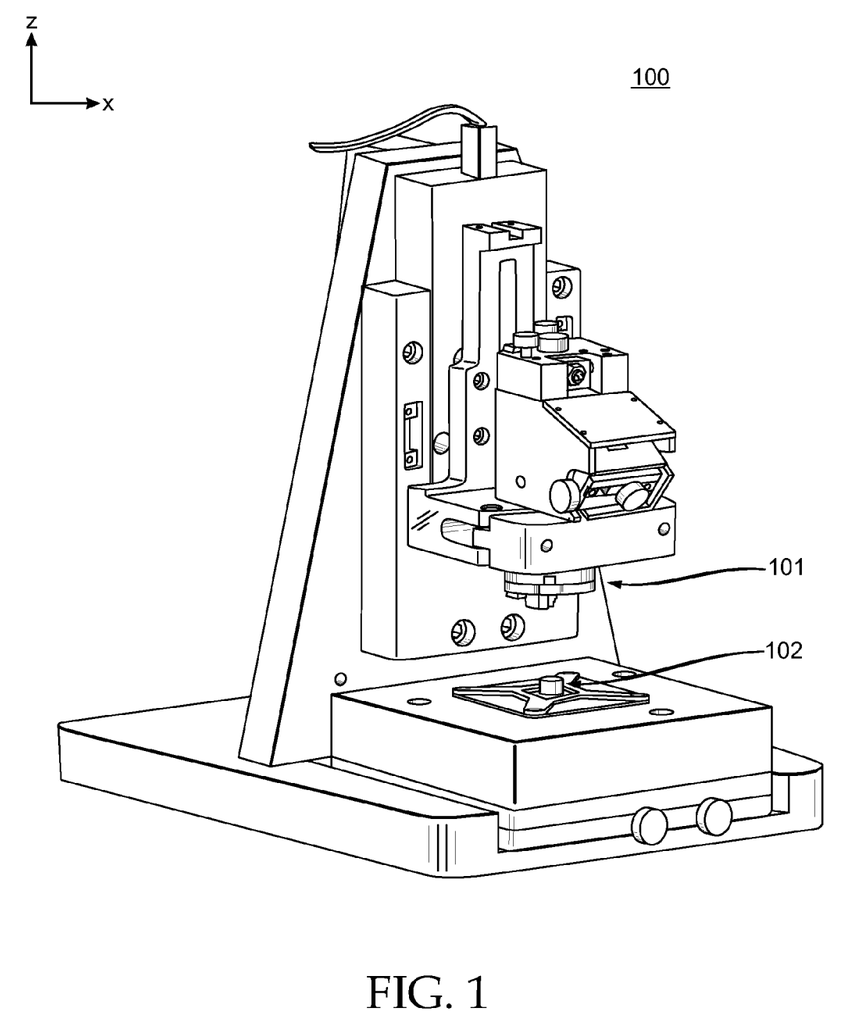
FIG. 1 is a perspective view of an AFM apparatus in accordance with a representative embodiment.

FIG. 1 is a perspective view of an apparatus 100 for atomic force microscopy (hereinafter "AFM 100") in accordance with a representative embodiment. As will be readily appreciated by one of ordinary skill in the art, the present teachings are applicable to various types of AFMs, which may be known to some as scanning force microscopes (SFMs). The AFM 100 comprises many electrical and mechanical components, the discussion of which is outside the scope of the present teachings. The AFM 100 includes a probe assembly 101, certain components of which are described in connection with representative embodiments herein. Notably, actuators and a drive circuit comprising a single amplifier (not shown in FIG. 1) are described more fully below in accordance with representative embodiments of the present teachings.

A sample 102 is maintained as shown for measurement and testing by the AFM 100. As described more fully herein, the sample 102 is generally moved in the x-y plane of the coordinate system of FIG. 1 to raster-scan the surface of the sample by an actuator (not shown), with the surface topology being mapped by motion of the probe assembly 101 in the z-direction.

Figure 2:
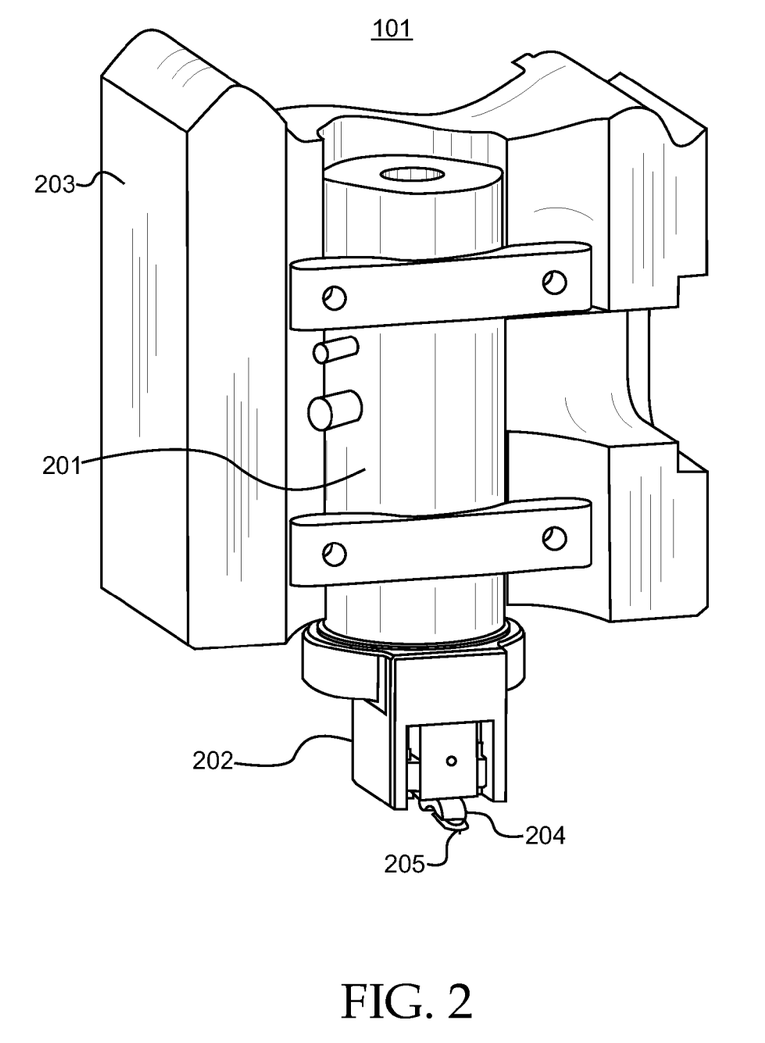
FIG. 2 is a perspective view of a probe assembly in accordance with a representative embodiment.

FIG. 2 is a perspective view of the probe assembly 101 shown in greater detail. The probe assembly 101 comprises a first actuator 201 and a second actuator 202 attached to a base 203. The base 203 is affixed to the AFM 100. As described more fully below, a drive circuit (not shown in FIGS. 1 and 2) is electrically connected to the first actuator 201 and to the second actuator 202, and includes a crossover network (not shown in FIG. 2). The drive circuit is configured to provide electrical power to and control of both the first actuator 201 and the second actuator 202.

A cantilever 204 extends from the second actuator 202 and comprises a probe tip 205. The probe tip 205 and cantilever 204 may be monolithically formed from a common substrate using known semiconductor processing techniques, and fastened to the second actuator 202. Alternatively, the second actuator 202, the cantilever 204 and the probe tip 205 may be monolithically formed from a common substrate. As described more fully herein, the first and second actuators 201, 202 function in tandem and usefully provide motion of the probe tip 205 and cantilever 204 in the ±z-direction of the coordinate system shown in order to maintain a substantially constant angular deflection of the cantilever 204 or distance between the probe tip 205 and surface of the sample 102. In a representative embodiment, the first and second actuators 201, 202 may be piezoelectric nanostepper actuators such as described in commonly owned U.S. Pat. No. 5,986,381, dated Nov. 16, 1999, entitled "Electrostatic Actuator with Spatially Alternating Voltage Patterns," to S. Hoen, et al., which is hereby incorporated by reference.

In a representative embodiment, the first actuator 201 is a pre-loaded piezoelectric stack actuator commercially available from Physik Instrumente (PI) GmbH & Co. and has a range of motion of approximately 15.0 µm in the z-direction at an applied voltage of approximately 100V. The first actuator 201 is selected to provide a comparatively large range of motion at a comparatively low frequency of operation. Illustratively, the first actuator 201 has a frequency response of approximately 1.0 kHz or less. As described more fully below, the first actuator 201 provides comparatively slow tracking over a greater distance of motion. The first actuator 201 has a large intrinsic capacitance compared to the second actuator 202. By way of example, the intrinsic capacitance of the first actuator is approximately 1.5 µF. Illustratively, the first actuator 201 has a resonance frequency in the range of approximately 10 kHz to approximately 20 kHz.

In a representative embodiment, the second actuator 202 comprises piezoelectric stack that is dimensionally smaller than the first actuator 201. The second actuator 202 is selected to provide a comparatively small range of motion. Illustratively, the second actuator 202 has a range of motion of approximately 1.0 µm to approximately 3.0 µm in the z-direction at an applied voltage of approximately 100V. Illustratively, the second actuator 202 has a frequency response of approximately 1.0 kHz or greater, with a typical frequency response in operation of approximately 20.0 kHz. Alternatively, the second actuator 202 has a frequency response of approximately DC to approximately 20 kHz. As described more fully below, the second actuator 202 provides comparatively high speed tracking over a smaller range of motion. The second actuator 202 has a small intrinsic capacitance compared to the first actuator 201. By way of example, the intrinsic capacitance of the second actuator 202 is approximately 0.03 µF. Illustratively, the second actuator 202 has a resonance frequency of approximately 200 kHz to approximately 300 kHz. Notably, the resonance frequency of the second actuator 202 is significantly greater than the highest frequency of operation of the probe assembly 101.

Figure 3:
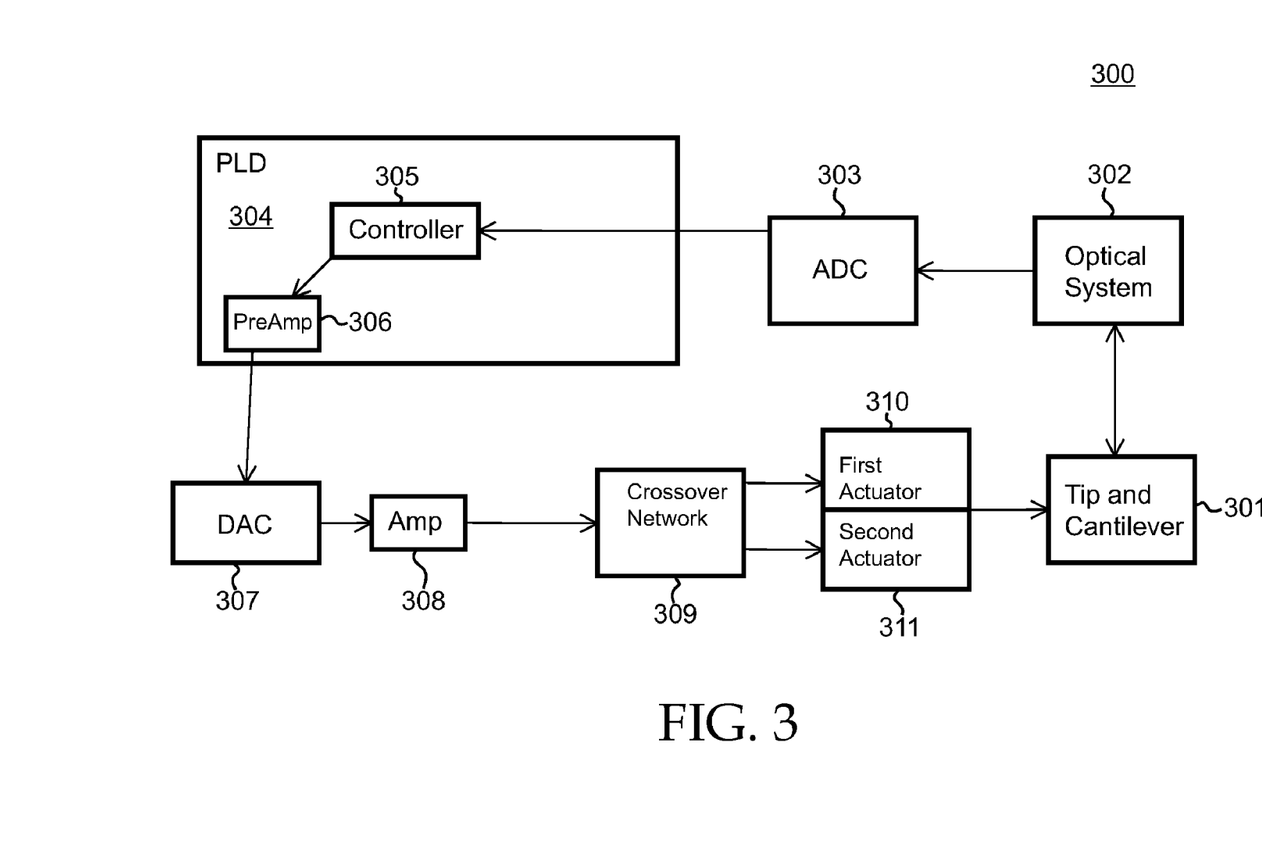
FIG. 3 is a simplified schematic block diagram of an AFM apparatus in accordance with a representative embodiment.

FIG. 3 is a simplified schematic block diagram of an AFM 300 in accordance with a representative embodiment. Certain aspects of the AFM 300 are common to the AFM 100 and probe assembly 101 described above in connection with representative embodiments of FIGS. 1 and 2. Many of the details of these aspects of the AFM 100 and probe assembly 101 are not repeated in order to avoid obscuring the description the representative embodiments presently described.

The AFM 300 comprises a tip and cantilever 301 and an optical system 302. In a representative embodiment, the tip and cantilever 301 are components of the probe assembly 101 described in connection with FIGS. 1 and 2. The optical system 302 comprises a light source (not shown) and a light detector (not shown) useful in detecting the deflection of the tip and cantilever 301 caused by movement along a particular coordinate axis (e.g., the z-axis of FIGS. 1 and 2). The light source may comprise a laser and the optical detector may comprise a four quadrant optical sensor, for example. As the optical system 302 is known to one of ordinary skill in the art, details thereof are not provided herein.

The optical system 302 provides an analog signal indicative of the motion of the tip and cantilever 301 to an analog-to-digital converter (ADC) 303. The ADC 303 provides a digital signal to a programmable logic device (PLD) 304. The PLD 304 is illustratively a field programmable gate array (FPGA). Alternatively, the PLD 304 may include an application specific integrated circuit (ASIC) and/or a microprocessor.

The PLD 304 comprises a controller 305 suitable in determining an error signal based on a difference between a measured deflection of the tip and cantilever 301 and the value for a set point of deflection of the tip and cantilever 301. More particularly, the controller 305 receives the digitized signal from the ADC 303 that is indicative of the movement of the tip and cantilever 301 and determines the value of the error signal by comparing the digitized signal with the value of the set point, which may be stored for example in a lookup table (LUT), a database or other type memory. In a representative embodiment the controller 305 is illustratively a proportional-integral-differential (PID) controller or other suitable feedback controller known to one of ordinary skill in the art.

The controller 305 provides the error signal to a pre-amplifier (preamp) 306. As described more fully below, the preamp 306 equalizes the drive signal when the extension per unit voltage of a first actuator 310 differs from the extension per unit voltage of a second actuator 311. Therefore, if the extensions per unit voltage of the first and second actuators 310, 311 are the same, the preamp 306 is not needed.

The preamp 306 provides the error signal to a digital-to-analog converter (DAC) 307. The DAC 307 provides the error signal in analog form to an amplifier 308, which provides an input signal to a crossover network 309 based on the analog error signal. Generally, the amplifier 308 includes a gain element or system suitable for receiving the error signal from the DAC 307 and providing the input signal to the crossover network 309. The crossover network 309 provides respective drive signals to the first actuator 310 and to the second actuator 311. Notably, the amplifier 308 drives both the first actuator 310 and the second actuator 311. As described more fully below, the crossover network 309 provides a comparatively low frequency drive signal to the first actuator 310, and a comparatively high frequency drive signal to the second actuator 311. In a crossover frequency region (referred to as a "crossover frequency range"), which is "between" high frequency operation and low frequency operation, the crossover network 309 provides a crossover frequency drive signal to the first actuator 310 and to the second actuator 311.

The crossover network 309 provides DC coupling to the first actuator 310 and AC coupling to the second actuator 311. This results in the driving of the first actuator 310 by the amplifier 308 when the input signal from the amplifier 308 is comparatively low frequency, and in the driving of the second actuator 311 by the amplifier 308 when the input signal from the amplifier 308 is comparatively high frequency. Thus, as noted above, the first actuator 310 responds to low frequency input signals and provides greater motion of the tip or cantilever along a particular axis (e.g., the z-axis of FIGS. 1 and 2); and the second actuator responds to high frequency input signals and provides lesser motion of the tip and cantilever 301 along the particular axis. In the crossover frequency range, when the input signal from the amplifier 308 is "between" high frequency and low frequency, the input signal from the amplifier 308 is provided to both the first actuator 310 and to the second actuator 311. As such, the first actuator 310 and the second actuator 311 are driven simultaneously in the crossover frequency range. The relative input of the first actuator 310 and the second actuator 311 depends on the frequency of the input signal from the amplifier 308. Accordingly, at comparatively low frequencies of the crossover frequency range, the movement of the tip and cantilever 301 is dominated by motion of the first actuator 310; and at comparatively high frequencies of the crossover frequency range, the movement of the tip and cantilever 301 is dominated by motion of the second actuator 311.

The first actuator 310 and the second actuator 311 are electrically and mechanically coupled together, resulting in the motion of the tip and cantilever 301 over a comparatively large frequency range and a corresponding comparatively large range of motion. Illustratively, the tip and cantilever 301 responds over a frequency range of approximately 0 Hz (DC) to approximately 20 kHz, and with a range of motion of approximately 0 μm to approximately 10.0 μm.

As described more fully below, in an embodiment, the crossover network 309 comprises a low pass frequency filter and a high pass frequency filter. Notably, the low pass frequency characteristic of the low pass frequency filter and the high pass frequency characteristic of the high pass frequency filter are set so that the phase of the first actuator 310 and the phase of the second actuator 311 have a relative phase shift of 0° at a frequency where both actuators are operating at −3 dB or about 70% of their respective ranges of motion. The frequency at which the first and second actuators 310, 311 are operating at −3 dB is referred to as the "crossover frequency." As a result, at some combinations of extension and frequency when the first and second actuators 310, 311 are both operating in tandem, there is substantially no relative phase shift, and the actuators beneficially function as a single unit.

As described in detail below, in a representative embodiment, the high pass frequency filter of the crossover network 309 comprises a DC blocking capacitor (not shown in FIG. 3) connected electrically in series with the intrinsic capacitance of the second actuator 311, and a high pass resistor (not shown in FIG. 3) connected electrically in series with the DC blocking capacitor. The low pass frequency filter of the crossover network 309 comprises a resistor (not shown in FIG. 3) connected electrically in series with the intrinsic capacitance of the first actuator 310. The selection of the values of the resistors of the crossover network 309 provides the crossover frequency of the crossover network 309. For example, when a large extension/low frequency response is desired, the crossover frequency is selected to be comparatively high so that the first actuator 310 is engaged over a wider portion of the operational range of the tip and cantilever 301. By contrast, when a small extension/high frequency response is desired, the crossover frequency is selected to be comparatively low, so that the second actuator 311 is engaged over a wider portion of the operational range of the tip and cantilever 301.

Figure 4:
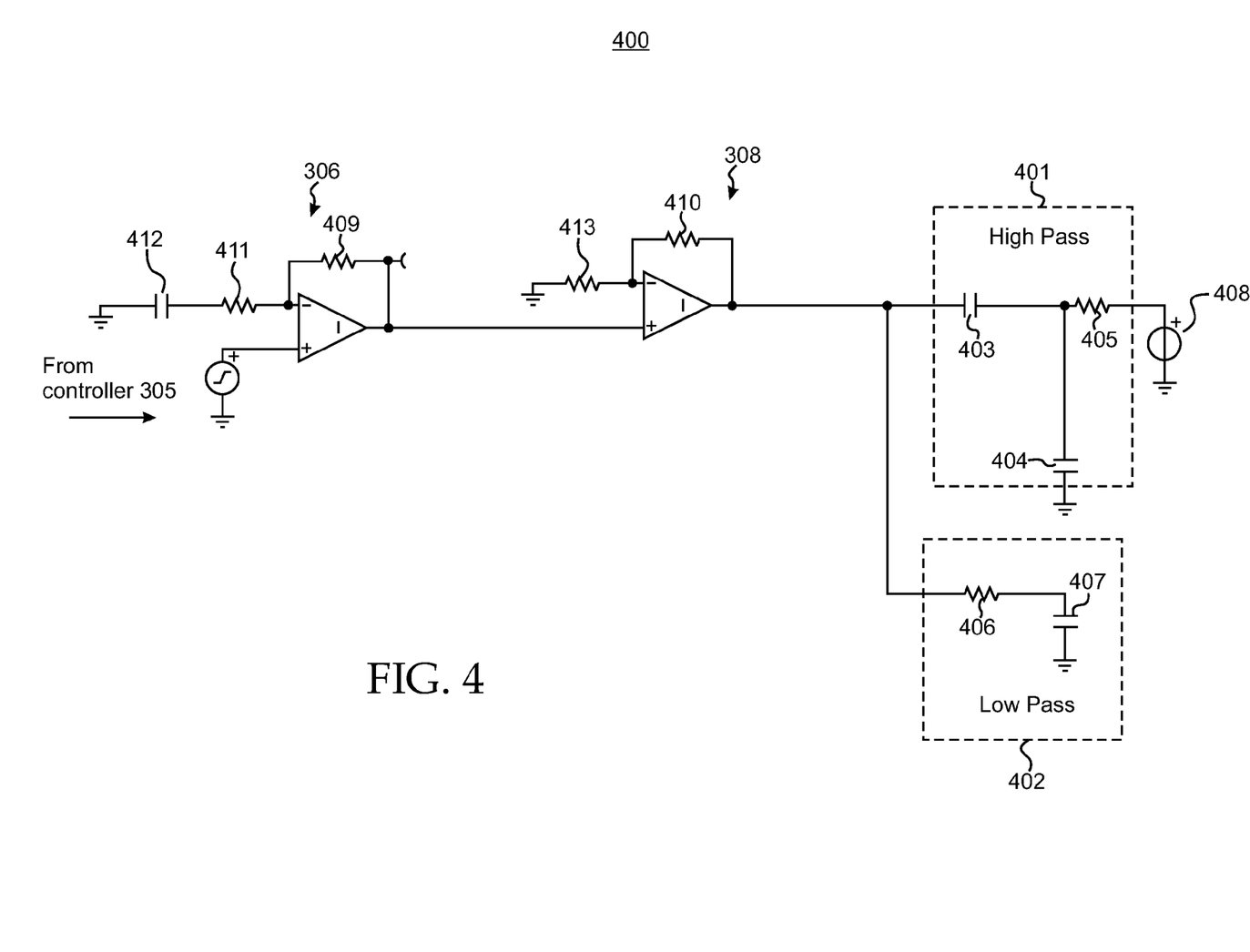
FIG. 4 is a simplified schematic diagram of a drive circuit in accordance with a representative embodiment.

FIG. 4 depicts a simplified schematic diagram of a drive circuit 400, comprising the preamp 306, the amplifier 308, and components of the crossover network 309, in accordance with a representative embodiment. Certain aspects of the components shown in FIG. 4 are common to those described above in connection with the representative embodiments of FIGS. 1-3. Details of the common aspects of the components may not be repeated to avoid obscuring the description of the representative embodiments.

The preamp 306 receives an error signal from the controller 305 (not shown in FIG. 4). As described more fully below, the preamp 306 equalizes the drive signal when the extension per unit voltage of the first actuator 310 (not shown in FIG. 4) does not equal the extension per unit voltage of the second actuator 311 (not shown in FIG. 4). The preamp 306 has a low frequency gain of 1.0 and a high frequency gain determined by the ratio of the extension per unit volt of the first and second actuators 310, 311. The high frequency gain is set by ratio of the value of resistor 409 to the value of a resistor 411.

The amplifier 308 provides an input signal to a high pass frequency filter 401 and to a low pass frequency filter 402 of the crossover network 309. The high pass frequency filter 401 comprises a DC blocking capacitor 403 connected electrically in series with an intrinsic capacitance 404 of the second actuator 311, and a high pass resistor 405 connected electrically in series with the DC blocking capacitor 403.

The second actuator 311 is biased to a midpoint of its excursion by the high pass resistor 405 connected in series with a bias voltage 408. The bias voltage 408 is provided by a power supply (not shown) or a voltage divider (not shown) from an existing power supply such as the power supply for amplifier 308. The bias voltage 408 maintains the DC extension of second actuator 311 at a rest position, which is approximately one-half of its full extension value in the present example. The output from the amplifier 308 drives the second actuator 311 away from its rest position to track the surface of the sample (e.g., sample 102). The selection of the rest position of the second actuator 311 at one-half of its full extension is illustrative. For example, if the surface of the sample is mostly "flat" (e.g., low amplitude variations in the z-direction according to the coordinate system of FIG. 1) with scattered "sharp" peaks (e.g., high amplitude variations in the z-direction according to the coordinate system of FIGS. 1 and 2), the rest position of the second actuator 311 may be set at another value (e.g., 25% or 75%) of its full extension to allow the second actuator 311 a greater range of motion along the z-axis in the coordinate system shown in FIGS. 1 and 2, for example. Accordingly, to allow for adjustment of the extension of the second actuator 311 at rest position, the bias voltage 408 may be adjustable.

As noted above, the high pass frequency filter 401 of the crossover network 309 comprises DC blocking capacitor 403 connected electrically in series with the intrinsic capacitance 404 of the second actuator 311, and the high pass resistor 405 connected electrically in series the DC blocking capacitor 403. The high pass frequency filter 401 passes comparatively high frequency signals (e.g., 3 kHz to greater than 10 kHz) from the amplifier 308 to the second actuator 311. The high frequency response of the second actuator 311 provides the ability to move the tip and cantilever 301 comparatively quickly, but with oscillations that are comparatively small in amplitude (e.g., approximately 20 kHz, 1.0 μm or less). Thus, in the representative embodiment, the second actuator 311 is AC coupled and does not respond to DC drive signals from the amplifier 308 due to the high pass frequency filter 401. In an alternative embodiment, the DC blocking capacitor 403 is removed, and the operational range of the second actuator 311 is extended from DC to comparatively high frequency (e.g., 10 kHz or greater).

The low pass frequency filter 402 of the crossover network 309 comprises a resistor 406 connected electrically in series with the intrinsic capacitance 407 of the first actuator 310. The low pass frequency filter 402 passes comparatively low frequency signals (e.g., DC to approximately 1 kHz) from the amplifier 308 to the first actuator 310, with the resistor 406 having a value selected to reduce the current load of the first actuator 310. This facilitates driving the first actuator 310, which has a comparatively high intrinsic capacitance, and provides a frequency response versus gain that drops off comparatively quickly. The low frequency response of the first actuator 310 provides the ability to move the tip and cantilever 301 with oscillations that are comparatively large amplitude (e.g., 10.0 μm or greater), but comparatively low frequency (e.g., DC). Thus, the first actuator 310 is low frequency coupled and does not respond to high frequency drive signals from the amplifier 308.

In the crossover frequency range, the passbands of the high pass frequency filter 401 and the low pass frequency filter 402 overlap. As such, in the crossover frequency range both the high pass frequency filter 401 of the crossover network 309 and the low pass frequency filter 402 of the crossover network 309 pass input signals from the amplifier 308 to the second actuator 311 and to the first actuator 310, respectively. Accordingly, the first actuator 310 and the second actuator 311 are driven simultaneously in the crossover frequency range. The relative input of the first actuator 310 and the second actuator 311 depends on the frequency of the input signal from the amplifier 308. At comparatively low frequencies of the crossover frequency range, the movement of the tip and cantilever 301 is dominated by motion of the first actuator 310; and at comparatively high frequencies of the crossover frequency range, the movement of the tip and cantilever 301 is dominated by motion of the second actuator 311.

The RC time constant of the low pass frequency filter 402 is formed by the resistor 406 and the intrinsic capacitance 407, and is selected to substantially match the RC time constant of the high pass frequency filter 401. At their respective resonance conditions, the first actuator 310 and the second actuator 311 do not behave as capacitors in an equivalent circuit, but rather behave as a capacitor in parallel with an inductor-resistor-capacitor (RLC) resonant circuit, that can be difficult to drive. The resistor 406 has a comparatively large resistance value to ensure that any response from the first actuator 310 is comparatively small at its resonance frequency (e.g., approximately 10 kHz to approximately 20 kHz).

Beneficially, the RC time constants for the high pass frequency filter 401 and the low pass frequency filter 402 are substantially identical. The matching of the RC time constant for the low pass frequency filter 402 for the first actuator 310 and RC time constant for the high pass frequency filter 401 for the second actuator 311 creates a "smooth" transition between the first actuator 310 to the second actuator 311 as the operational frequency of the AFM 300 changes from comparatively low frequency (e.g., less than 1 kHz) to comparatively high frequency (e.g., greater than 10 kHz) in response to the surface topology of a sample in a particular dimension (e.g., the z-direction of the coordinate system of FIGS. 1 and 2). As described below in connection with FIG. 6C, if the RC time constant of the low pass frequency filter 402 is greater than the RC time constant of the high pass frequency filter 401 due to the relative phase and amplitude of the first actuator 310 and the second actuator 311, their combined excursion would be greater than 1.0, resulting in a "bump" in the response at the crossover frequency. If the RC time constant of the low pass frequency filter 402 is less than the RC time constant of the high pass frequency filter 401, due to the relative phase and amplitude of the first actuator 310 and the second actuator 311, their combined excursion would be less than 1.0, resulting in a "dip" in the response at the crossover frequency.

In representative embodiments, the high pass frequency filter 401 and the low pass frequency filter 402 are each first order Butterworth filters with roll off of approximately 6 dB per octave, and with matching −3 dB set points. Moreover, because the crossover point is set at the −3 dB set points of both the high pass frequency filter 401 and the low pass frequency filter 402, the phases of the first actuator 310 and the second actuator 311 are opposite at the crossover point, their combined extension is unity, and the first and second actuators 310, 311 move as a single unit. As a result, as the output frequency of the amplifier 308 changes from a comparatively low frequency to a comparatively high frequency, the first actuator 310 accounts for less movement of the tip and cantilever 301 and the second actuator 311 accounts for more movement of the tip and cantilever 301.

As the frequency of the input signal from the amplifier 308 changes from a comparatively high frequency to a comparatively low frequency, the second actuator 311 accounts for less movement of the tip and cantilever 301 and the first actuator 310 accounts for more movement of the tip and cantilever 301. Thus, for comparatively low frequency/high extension (amplitude) response, the first actuator 310 accounts for most of the movement of the tip and cantilever 301; and for comparatively high frequency/low extension (amplitude) response, the second actuator 311 accounts for most of the movement of the tip and cantilever 301. In a crossover frequency range both the first actuator 310 and the second actuator 311 are engaged.

The crossover frequency can be changed depending upon the surface topology being scanned. For example, if the second actuator 311 is being driven near the limits of the output of the amplifier 308 the crossover frequency can be raised. Thereby the first actuator 310 effects more of the combined extension of the first and second actuators 310, 311. By contrast, if the second actuator 311 is being driven at low power by the amplifier 308, the crossover frequency can be lowered. Thereby, the second actuator 311 effects more of the combined extension of the first and second actuators 310, 311.

Figure 5:
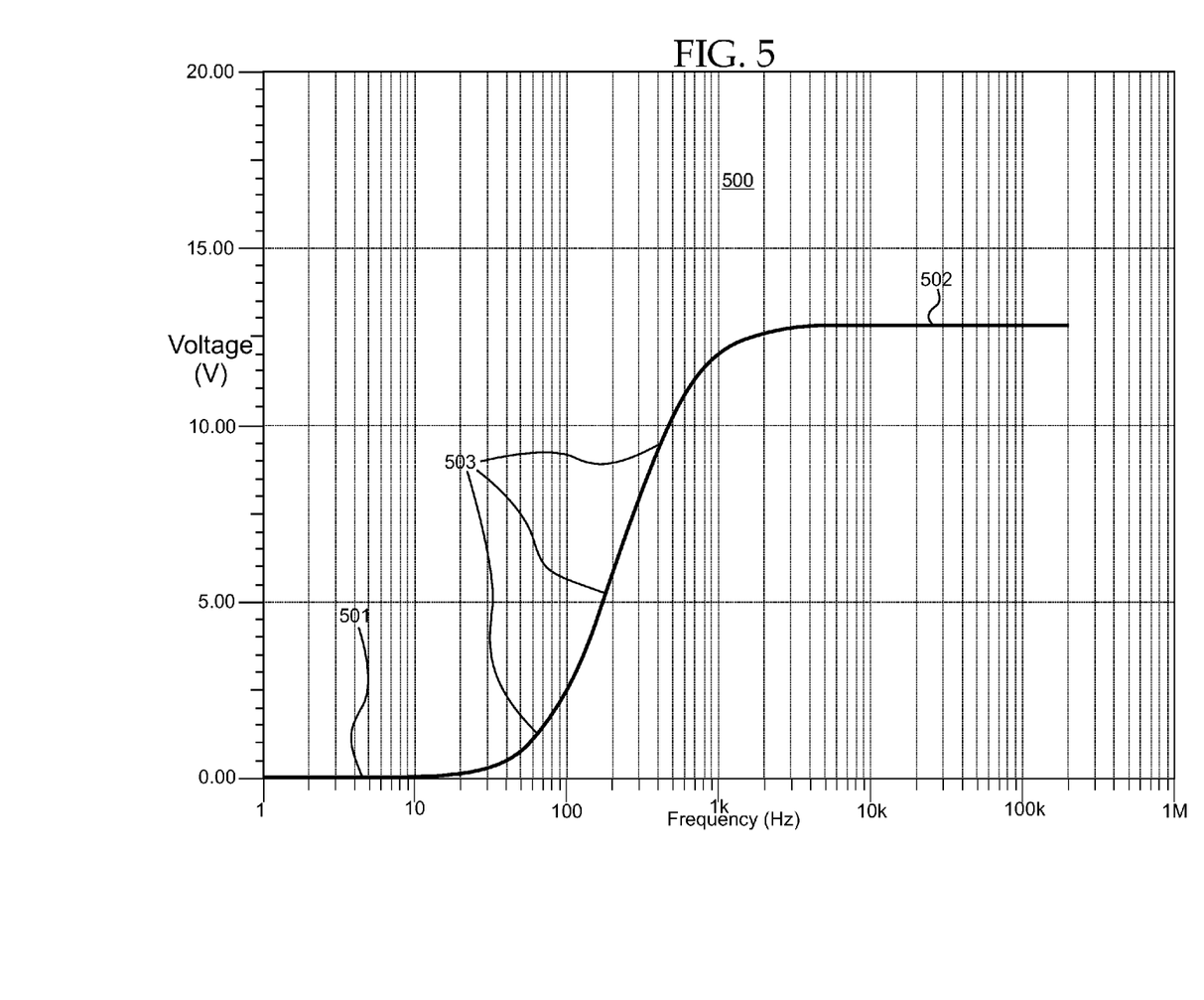
FIG. 5 depicts a graph of output voltage versus frequency of a preamplifier in accordance with a representative embodiment.

Resistor 409 and capacitor 412 set the frequency where the gain of the preamp becomes greater than 1.0 (region 503 in FIG. 5). In a representative embodiment described below, the gain exceeds 1.0 beginning at approximately 100 Hz. Resistor 411, which is connected to one input of the preamp 306, sets the maximum high frequency gain of the preamp 306. Resistors 410 and 413 set the gain of the amplifier 308.

FIG. 5 depicts a graph 500 of output voltage versus frequency for the preamp 306 described above in connection with representative embodiments. As noted previously, in many instances, the excursion per unit voltage of the first actuator 310 does not equal the excursion per unit voltage of the second actuator 311. Generally, the gain of the preamp 306 is determined from the ratio of the extension per unit voltage of the first actuator 310 and the second actuator 311 plus additional gain needed to compensate for the reduction in voltage applied to the second actuator 311 due to the capacitive divider formed by the DC blocking capacitor 403 and the intrinsic capacitance 404 of the second actuator 311. Because the response of the first and second actuators 310, 311 depends on the drive frequency, the gain of the preamp 306 must change with changing input frequency from the controller 305.

Illustratively, the excursion per unit voltage for the first actuator 310 is 15 µm/100V and the excursion per unit voltage for the second actuator is 3 µm/100V. To maintain a flat frequency response, in the present example the drive signal to the amplifier 308 from the preamp 306 must be equalized to have a high frequency gain that is five (5) times (15 µm/3 µm) that of the low frequency gain. As such, in region 501, which corresponds to the comparatively low frequency response of the first actuator 310, the gain of the preamp 306 is approximately 1.0.

In region 502, which corresponds to the comparatively high frequency response of the second actuator 311, the gain of the preamp 306 is approximately 12.0 in the present example to ensure compensation for the capacitive divider formed by the DC blocking capacitor 403 and the intrinsic capacitance 404 of the second actuator 311.

In region 503, which corresponds to a frequency range where both the first actuator 310 and the second actuator 311 are engaged, the gain varies to ensure that suitable gain is provided to both the first actuator 310 and the second actuator 311. Notably, increasing the gain of the preamp 306 to equalize the drive signal when the extension per unit voltage of the first actuator 310 does not equal the extension per unit voltage of the second actuator 311 shifts the crossover frequency. For example, in the representative embodiment the first actuator 310, which has a roll off of approximately −6 dB per octave, is boosted by the +6 dB per octave gain of the preamp 306. As noted above, the crossover frequency is set by the capacitor 412, and the resistors 409, 411 in combination. The final (high frequency) gain of the preamp 306 is based on the difference in the "gain" (nm/volt) of the first actuator 310 and the second actuator 311. For example, if the extension per unit voltage of the first actuator 310 is five (5) times greater than that of the second actuator 311, the preamp 306 provides a gain of five to the input signal at high frequency. The frequency characteristics of the preamp 306 match the high and low pass characteristics in region 503. In this example, as the operational frequency of the AFM 300 increases, the gain of the preamp 306 is increased so that the second actuator 311 is engaged more in region 503. By contrast, as the operational frequency of the AFM 300 decreases, the gain of the preamp 306 is decreased so that the first actuator 310 is engaged more in region 503.

Figure 6A:
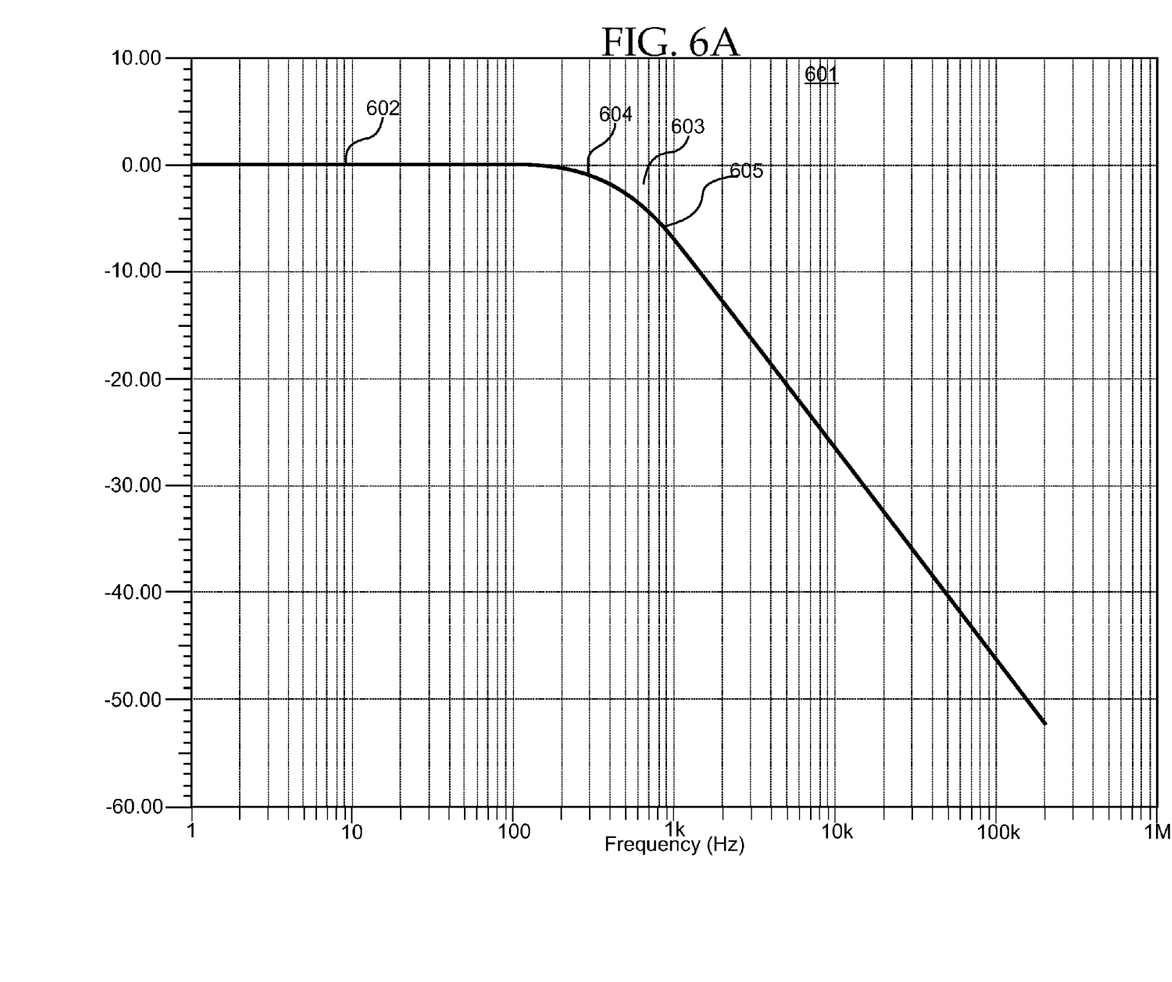
FIG. 6A depicts a graph of gain (in dB) versus frequency of an actuator in accordance with a representative embodiment.

FIG. 6A depicts a graph 601 of the gain versus frequency of the first actuator 310 in accordance with a representative embodiment. In region 602, the gain of the first actuator 310 is unity at comparatively low frequency input signals from the amplifier 308. Region 602 is the comparatively low frequency region of operation of the AFM 300, and the movement of the tip and cantilever 301 is effected almost entirely by the first actuator 310. As noted above, the first actuator 310 is selected to provide a comparatively large amplitude excursion (e.g., 10 µm) at comparatively low frequency (e.g., DC) operation.

In region 603, the gain of the first actuator 310 falls below unity as the input frequency from the amplifier 308 increases. Notably, at approximately 500 Hz, the gain of the first actuator 310 is −3 dB. Region 603 is the crossover frequency region of operation of the AFM 300.

As described below, as the input frequency from the amplifier 308 increases, while both the first and second actuators 310, 311 effect movement, the movement of the tip and cantilever 301 is effected less by the first actuator 310 and more by the second actuator 311. For example, at point 604 where the input frequency from the amplifier 308 is approximately 250 Hz, the gain of the first actuator 310 is approximately −1 dB, and the first actuator 310 accounts for a significant portion of the movement of the tip and cantilever 301. At point 604 some of the movement of the tip and cantilever 301 is provided by the second actuator 311. By contrast, at point 605 the input frequency from the amplifier 308 is approximately 1.0 kHz, the gain of the first actuator 310 is approximately −5 dB, and the first actuator 310 accounts for an insignificant portion of the movement of the tip and cantilever 301. At point 605 nearly all of the movement of the tip and cantilever 301 is provided by the second actuator 311.

Figure 6B:
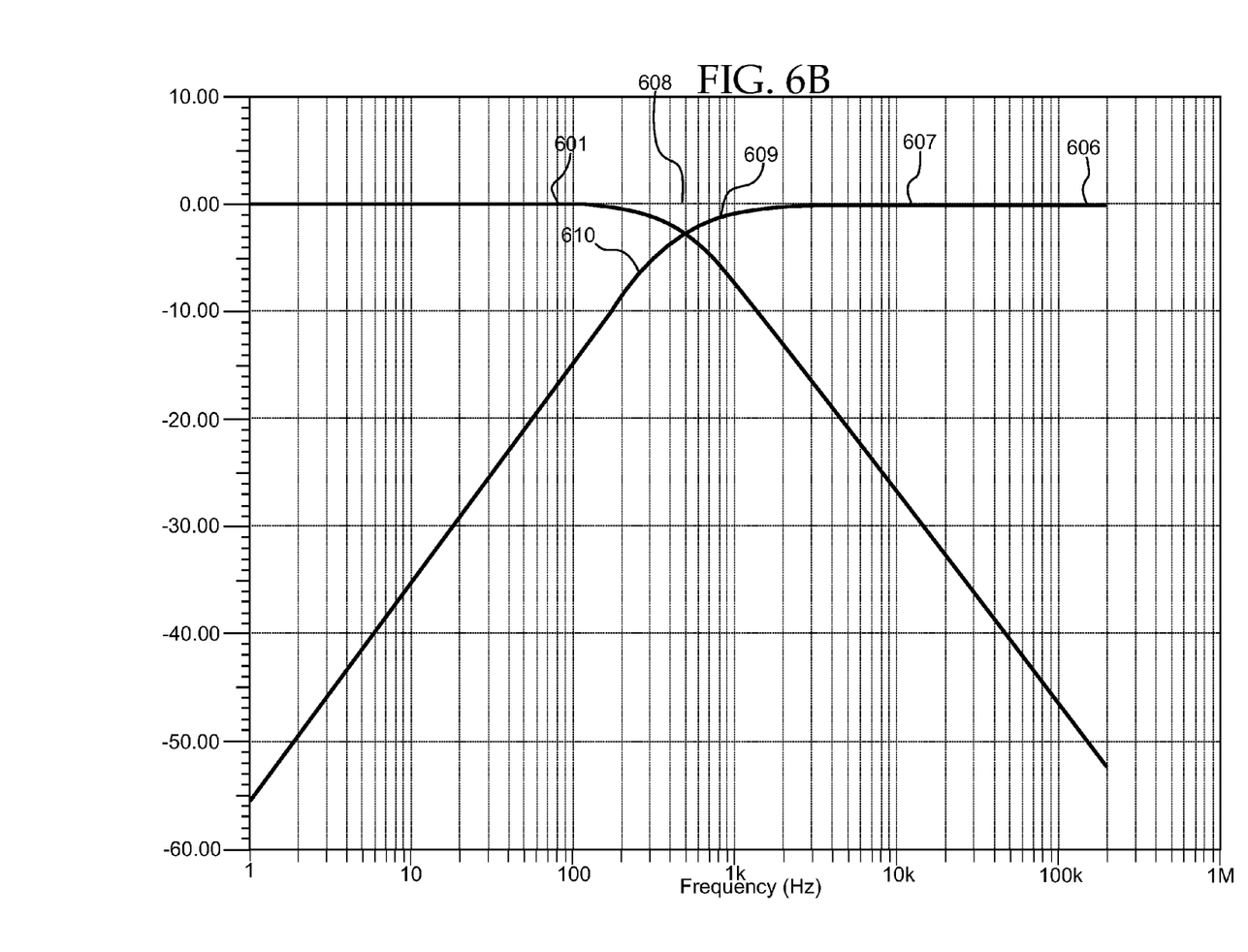
FIG. 6B depicts a graph of gain (in dB) versus frequency of actuators in accordance with a representative embodiment.

FIG. 6B depicts a graph 606 of the gain versus frequency of the second actuator 311 in accordance with a representative embodiment, and superposed over graph 601. In region 607, the gain of the second actuator 311 is unity at comparatively high input frequencies from the amplifier 308. Region 607 is the comparatively high frequency region of operation of the AFM 300, and the movement of the tip and cantilever 301 is effected entirely by the second actuator 311. As noted above, the second actuator 311 is selected to provide a comparatively small amplitude excursion (e.g., 0.1 µm) at comparatively high frequency (e.g., 10 kHz).

In region 608, the gain of the second actuator 311 falls below unity as the input frequency from the amplifier 308 decreases. Notably, at approximately 500 Hz, the gain of the second actuator 311 is −3 dB. Region 608 is the crossover frequency region of operation of the AFM 300.

As the input frequency from the amplifier 308 decreases, while both the first and second actuators 310, 311 effect movement, the movement of the tip and cantilever 301 is effected less by the second actuator 311 and more by the first actuator 310. For example, at point 609 where the input frequency from the amplifier 308 is approximately 1.6 kHz, the gain of the second actuator 311 is approximately −1 dB, and the second actuator 311 accounts for a significant portion of the movement of the tip and cantilever 301. At point 609 some of the movement of the tip and cantilever 301 is provided by the first actuator 310. By contrast, at point 610 where the input frequency from the amplifier 308 is approximately 250 Hz, the gain of the second actuator 311 is approximately −5 dB, and the second actuator 311 accounts for an insignificant portion of the movement of the tip and cantilever 301. At point 610 nearly all of the movement of the tip and cantilever 301 is provided by the first actuator 310.

Figure 6C:
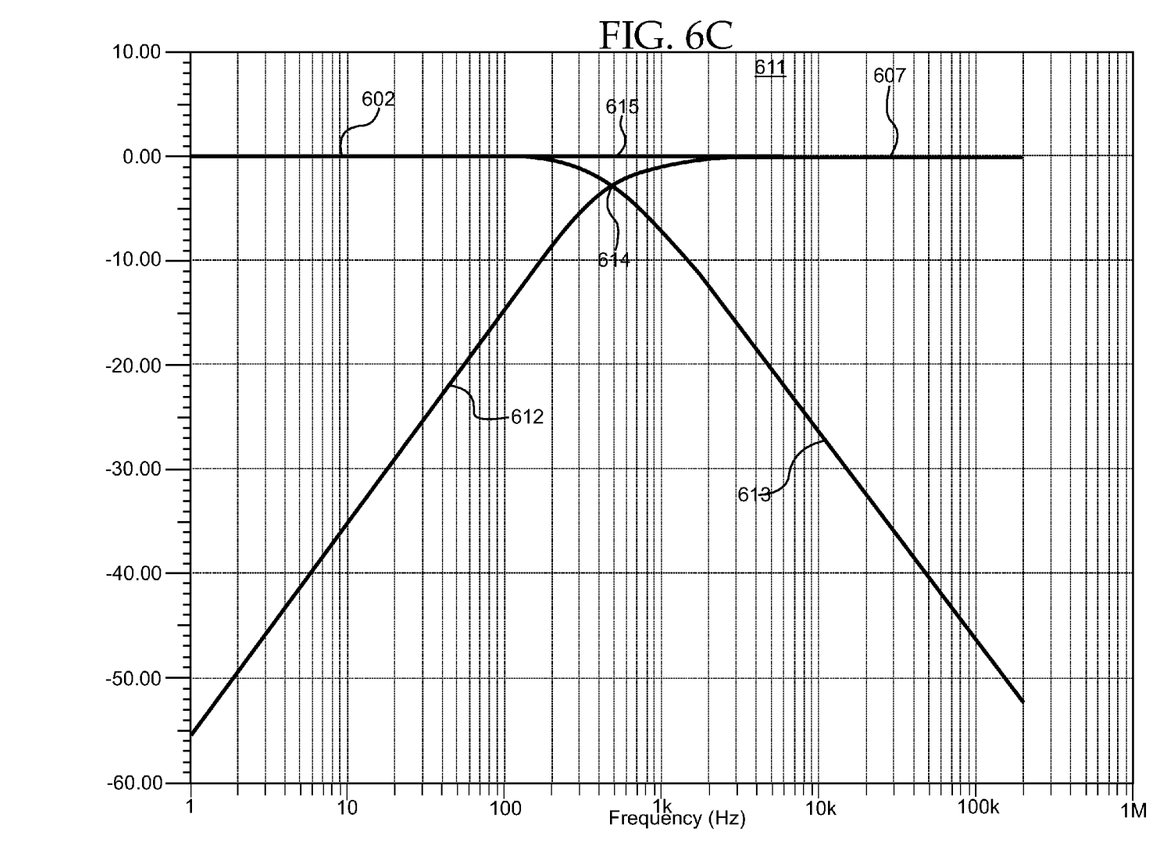
FIG. 6C depicts a graph of gain (in dB) versus frequency of a combination of actuators in accordance with a representative embodiment.

FIG. 6C depicts a graph 611 of the combined gain (in dB) versus frequency of the first and second actuators 310, 311 in accordance with a representative embodiment. In region 602, the amplifier 308 provides a comparatively low frequency drive signal, and as a result, the first actuator 310 is engaged. In particular, the gain of the first actuator 310 is approximately 1.0, and the first actuator 310, which functions at comparatively low frequencies, accounts for substantially all movement of the tip and cantilever 301. As noted previously, the first actuator 310 is configured to respond to comparatively large amplitude signals from the amplifier 308. Accordingly, the first actuator 310 is configured to move the tip and cantilever 301 over a greater distance in the z-direction in the coordinate system shown in FIGS. 1 and 2, for example. So, for example, if a sample (e.g., sample 102) is comparatively flat, but gradually rises over a raster scan in the x-y plane in the coordinate system shown in FIG. 2, for example, the first actuator 310 would be engaged to move the tip and cantilever 301.

In region 612 the amplifier 308 provides a low frequency drive signal, and as a result, the second actuator 311 is disengaged. In particular, in region 612 the gain of the second actuator 311 is approximately −20.0 dB to approximately −55 dB, and the second actuator 311, which functions at comparatively high frequencies, accounts for essentially none of movement of the tip and cantilever 301. As noted previously, the second actuator 311 is configured to respond to comparatively high frequency and small amplitude signals from the amplifier 308. Accordingly, the second actuator 311 does not account for much, if any, of the movement of the tip and cantilever 301 in this region of operation.

In region 613, the amplifier 308 provides a comparatively high frequency drive signal, and as a result, the second actuator 311 is engaged. In particular, the gain of the second actuator 311 is approximately 1.0, and the second actuator 311, which functions at comparatively high frequencies, accounts for substantially all movement of the tip and cantilever 301. As noted previously, the second actuator 311 is configured to respond to comparatively small amplitude signals from the amplifier 308. Accordingly, the second actuator 311 is configured to move the tip and cantilever 301 over a smaller distance in the z-direction in the coordinate system shown in FIG. 2, for example. So, for example, if a sample (e.g., sample 102) has significant surface roughness with comparatively small amplitude fluctuations in the z-direction over a raster scan in the x-y plane in the coordinate system shown in FIGS. 1 and 2, for example, the second actuator 311 would be engaged to move the tip and cantilever 301.

Similarly, in region 613, the amplifier 308 provides a high frequency drive signal, and as a result, the first actuator 310 is disengaged. In particular, the gain of the first actuator 310 rolls off from approximately −20.0 dB to approximately −55 dB in region 613, and the first actuator 310, which functions at comparatively low frequencies, accounts for essentially none of movement of the tip and cantilever 301. As noted previously, the first actuator 310 is configured to respond to comparatively low frequency and large amplitude signals from the amplifier 308. Accordingly, the first actuator 310 does not account for much, if any, of the movement of the tip and cantilever 301 in this region of operation.

A crossover point 614 is shown between regions 602 and 607. The frequency of the crossover point 614 (referred to as the crossover frequency) is selected so that the gain of the first actuator 310 and the second actuator 311 are each −3 dB (referred to as the at the −3 dB points). At the crossover point 614, the phase of the first actuator 310 lags the input signal from the amplifier 308 by 45° and the phase of the second actuator 311 leads the input signal from the amplifier by 45°. While the sum of the gain of the first and second actuators 310, 311 exceeds 1.0 (i.e., 1.414), because of the relative phase of the first and second actuators 310, 311, their combined gain is approximately 1.0. This is shown at a crossover region 615, which connects the substantially "flat" gain of regions 602 and 607, and results in a gain of approximately 1.0 across the entire frequency range of operation.

In crossover region 615, both the first and second actuators 310, 311 are engaged, and thus both drive the tip and cantilever 301. As such, in crossover region 615 the combination of the input from the first actuator 310 and the second actuator 311 drives the tip and cantilever 301. However, because of their relative phase across crossover region 615, the first and second actuators 310, 311 function as a single unit. At the crossover frequency the gain of the first actuator 310 is −3 dB (0.707× of its DC value) and its phase is illustratively −45°. The gain of the second actuator 311 (after adjustment to match the gain by the preamp 306) is −3 dB (0.707× its high frequency value) with a phase of illustratively +45 degrees. The resultant gain of the first and second actuators 310, 311 at the crossover frequency is 1.0 with a phase angle of 0 degrees. Because the gain of the combination of the first and second actuators 310, 311 in the crossover region 615 is maintained at approximately 1.0, the first and second actuators 310, 311 function as a substantially single unit.

As alluded to previously, if the time constants of the high pass frequency filter 401 and the low pass frequency filter 402 did not match, crossover region 615 would not be "smooth" and could have a "bump" or a "dip." For example, if the crossover frequency (i.e., the frequency at crossover point 614) were greater than 500 Hz in the present example, and the respective −3 dB points of the high pass frequency filter 401 and the low pass frequency filter 402 were not at the same frequency, the sum of the extensions of the first and second actuators 310, 311 would be greater than 1.0, and there would be a "bump" in crossover region 615. For purposes of illustration, suppose the graph 606 were "shifted" so that the crossover point 614 coincided with a gain of the second actuator of −2 dB, the combined gain of the first and second actuators 310, 311 would not be "flat" over the crossover region 615; and there would be a "bump" in the crossover region 615. By contrast, if the crossover frequency (i.e., crossover point 614) were lower than 500 Hz in the present example, and the −3 dB points of the high pass frequency filter 401 and the low pass frequency filter 402 were not at the same frequency, the sum of the extensions of the first and second actuators 310, 311 would be less than 1.0, and there would be a "dip" in crossover region 615. For purposes of illustration, suppose the graph 606 were "shifted" so that the crossover point 614 coincided with a gain of the second actuator of −4 dB, the combined gain of the first and second actuators 310, 311 would not be "flat" over the crossover region 615; and there would be a "dip" in the crossover region 615. Scenarios where there is a "bump" or a "dip" in crossover region 615 should be avoided because the combined excursion of the first and second actuators 310,311 does not equal 1.0, and the response of the AFM 300 is not linear. As should be appreciated, this would result in measurement errors by the AFM 300.

In view of this disclosure it is noted that the various apparatuses for AFM and drive circuits therefor can be implemented in variant structures and using variant components in keeping with the present teachings. Further, the various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. An apparatus for atomic force microscopy (AFM), comprising:
   a first actuator configured to move a cantilever along an axis;
   a second actuator configured to move the cantilever along the axis;
   an amplifier; and
   a crossover network connected between the amplifier, and the first actuator and the second actuator, wherein the crossover network is adapted to provide a first drive signal to the first actuator over a first frequency range and to provide a second drive signal to the second actuator over a second frequency range, wherein the second actuator has an intrinsic capacitance and the crossover network forms a low pass frequency filter with the intrinsic capacitance.

2. An apparatus as claimed in claim 1, wherein the high pass frequency filter and the low pass frequency filter are connected electrically in parallel.

3. An apparatus as claimed in claim 1, wherein the first actuator and the second actuator each comprise a piezoelectric element.

4. An apparatus as claimed in claim 1, further comprising a pre-amplifier connected to an input of the amplifier, wherein the pre-amplifier equalizes a drive signal from the amplifier when an extension per unit voltage of the first actuator does not equal an extension per unit voltage of the second actuator.

5. An apparatus as claimed in claim 1, wherein the crossover network is adapted to provide a third signal to the first actuator and to the second actuator over a crossover frequency range.

6. An apparatus as claimed in claim 1, wherein the first actuator and the second actuator each have a gain of approximately −3 dB at a crossover frequency.

7. An apparatus as claimed in claim 1, wherein the first frequency range is a comparatively low frequency range.

8. An apparatus as claimed in claim 1, wherein the second frequency range is a comparatively high frequency range.

9. A drive circuit for driving a first actuator and a second actuator of an atomic force microscopy (AFM) apparatus, the drive circuit comprising:
   an amplifier;
   a crossover network connected between the amplifier, and the first actuator and the second actuator, wherein the crossover network is adapted to provide a first drive signal to the first actuator over a first frequency range and to provide a second drive signal to the second actuator over a second frequency range, wherein the second actuator has an intrinsic capacitance and the crossover network forms a low pass frequency filter with the intrinsic capacitance.

10. A drive circuit as claimed in claim 9, wherein the high pass frequency filter and the low pass frequency filter are connected electrically in parallel.

11. A drive circuit as claimed in claim 9, further comprising a pre-emphasis circuit connected to an input of the amplifier.

12. A drive circuit as claimed in claim 11, wherein the pre-amplifier equalizes a drive signal from the amplifier when an extension per unit voltage of the first actuator does not equal an extension per unit voltage of the second actuator.

13. A drive circuit as claimed in claim 9, wherein the crossover network is adapted to provide a third signal to the first actuator and to the second actuator over a crossover frequency range.

14. A drive circuit as claimed in claim 9, wherein the first actuator and the second actuator each have a gain of approximately −3 dB at a crossover frequency.

15. A drive circuit as claimed in claim 9, wherein the first frequency range is a comparatively low frequency range.

16. A drive circuit as claimed in claim 9, wherein the second frequency range is a comparatively high frequency range.

* * * * *